No. 656,346. Patented Aug. 21, 1900.
H. DIETZ.
BOLTING MILL.
(Application filed Nov. 2, 1898.)
(No Model.)
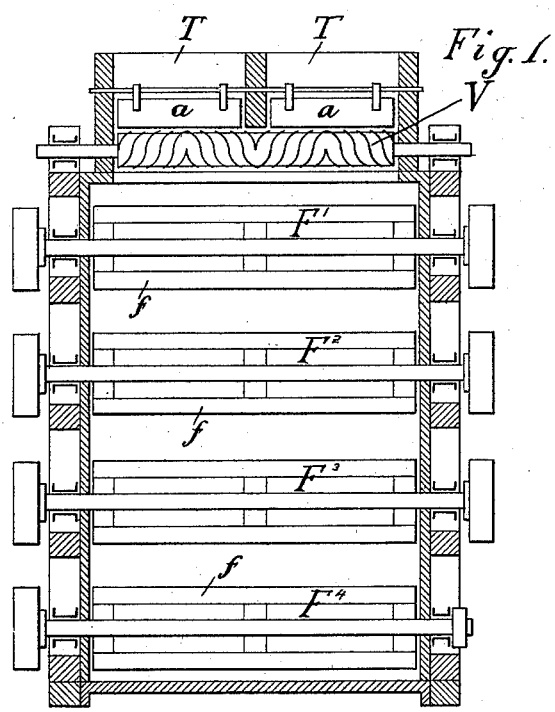
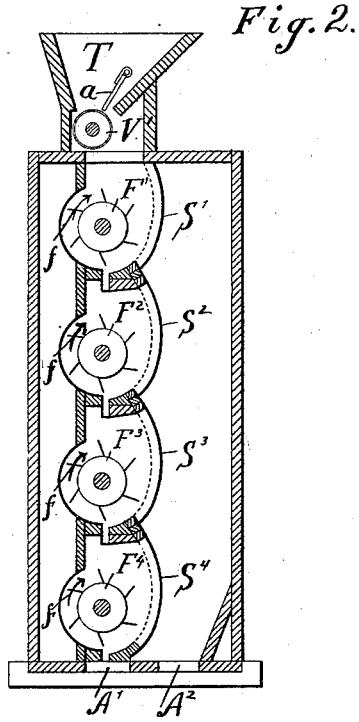
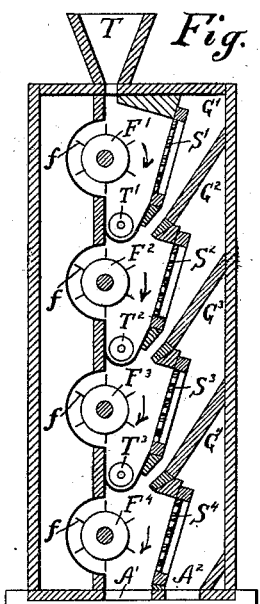
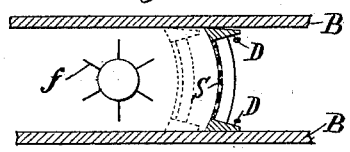
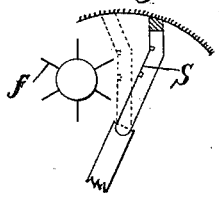
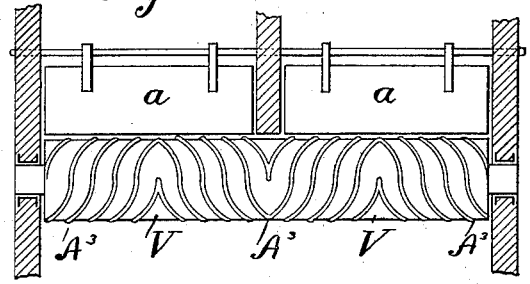
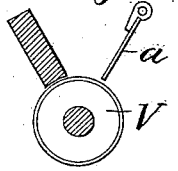
WITNESSES:
INVENTOR:
Hermann Dietz
BY
ATTORNEY

UNITED STATES PATENT OFFICE.

HERMANN DIETZ, OF LEIPSIC, GERMANY.

BOLTING-MILL.

SPECIFICATION forming part of Letters Patent No. 656,346, dated August 21, 1900.

Application filed November 2, 1898. Serial No. 695,279. (No model.)

*To all whom it may concern:*

Be it known that I, HERMANN DIETZ, inventor, a subject of the Emperor of Germany, residing at 16 Funkenburgstrasse, Leipsic, German Empire, have invented certain new and useful Improvements in Bolting-Mills, of which the following is a specification.

This invention has reference to improvements in bolting-mills; and it has for its object to construct a bolting-mill which will distribute the flour to be sifted evenly over the entire surface of the sieve or sieves and which will do its work more thoroughly and with less power than by the mills hitherto used.
In vertically-arranged bolting-mills as used at present the flour is carried by wings or brushes around the sieve, while in my improved apparatus the flour is caused to fall between fan-blades and is at once thrown by the blades against stationary sieves, through which the flour passes, while the coarse parts and bran are free to fall and be discharged at the bottom without being carried around by the blades.
My invention will be best understood by reference to the annexed drawings, in which—

Figure 1 is a vertical section on the axial lines of the shafts of one form of my invention. Figs. 2 and 3 are vertical sections across the fan-shafts of two forms of the apparatus. Figs. 4 and 5 are vertical sections of a curved and a polygonal sieve. Figs. 6 and 7 are a front and side elevation, on a larger scale, of the distributing-roller, Fig. 1, partly in section.

Similar letters of reference designate corresponding parts throughout the several views of the drawings.

Figs. 1 to 3 represent a bolting-mill with a number of sieves arranged one below the other. The funnel-shaped hopper T is substantially of the same width as are the fans F' F². I prefer to employ a distributing device, as shown in Fig. 1 and on a larger scale in Figs. 6 and 7, for distributing the flour evenly across the width of the first fan F'. This distributing device consists of a roller V, revolubly arranged within the mouth of the hopper and being provided with grooves or ribs $A^3$, starting from the middle of the roller and running spirally in opposite directions to the ends of the roller. A gate $a$ prevents the flour from falling down in bulk. Upon the distributing-roller being rotated the flour falls upon the first fan F', provided with wings or sweeps $f$, which latter throw it against the sieve S', which is obliquely arranged, as in Fig. 3, or curved, as in Fig. 2. The coarse particles of the flour are retained by the meshes of the sieve and roll down into the second fan F², provided underneath the fan F', as is clearly shown in Fig. 2. The flour, having passed through the sieve, passes out at the bottom through the opening $A^2$. The fan F² and the subsequent fans F³ F⁴ work in a manner similar to fan F', each fan throwing the coarse particles, rolled down from the fan above, against the sieve. The fans do no transporting. They simply throw the flour upon the sieves S' S² S³ S⁴, the motive power accordingly being relatively low. The bolted flour is removed out of the bottom opening $A^2$, while the coarse particles are taken out at opening A'. In place of the grooved roller V, Fig. 1, a plain roller V', Fig. 2, may be used.

A modification of the arrangement is shown in Fig. 3. The hopper T in the drawing is shown without the distributing-roller V; but it is obvious that such a distributing-roller may be made use of to advantage. The uppermost fan F' throws the flour against the curved sieve S', the coarse particles falling down upon the conveyer T', which conveys them sidewise out of the mill. The sifted flour falls into the chute G', leading it to the second fan F², which throws it through the second sieve S², and so on to the lowermost fan F⁴, which has no conveyer, the coarse particles falling straight down and out of the opening A'. The sifted flour is removed out of the opening $A^2$.

It will be readily understood in view of the foregoing description that in the apparatus shown the material fed in at the top is at once thrown against the stationary sieves and that the lighter bran particles are not thrown as far as the heavier grounds, and therefore the material is not carried around or rubbed against the sieves. Consequently superior efficiency—that is to say, a greater product—is obtained with less power, and coarser sieves may therefore be used.

I claim—

1. In a bolting-mill, the combination of means for evenly distributing the flour to be bolted over the entire width of the mill, a fan (one or more) consisting of a series of blades projecting from a drum on a rotating shaft, each fan inclosed by a casing provided with a supply-opening at the top, a discharge-opening for the coarse particles at the bottom, and a stationary sieve located away to one side of the fan in the direction of motion of its upper periphery, and a receptacle for the sifted flour on the outer side of the screen or screens provided with a discharge opening or chute at the bottom, whereby the flour fed in at the top is caused to fall between the blades at the top of the fans and is thrown against the sieve, through which the fine flour passes, while the coarse flour passes out from the bottom, substantially as specified.

2. In a bolting-mill, the combination of a hopper extending over the entire width of the mill, a distributing-roller arranged at the lower end of the hopper, said roller being provided with grooves or ribs running spirally in opposite directions, a gate extending over the distributing-roller, a fan (one or more) located beneath the distributing-roller, each fan inclosed by a casing with a supply-opening at the top, a discharge-opening for the coarse particles at the bottom, and a stationary sieve located away to one side of the fan in the direction of motion of its upper periphery, and a receptacle for the sifted flour on the outside of the sieve or sieves provided with a discharge opening or chute at the bottom, substantially as and for the purpose specified.

Signed by me at Leipsic, Germany, this 18th day of October, 1898.

HERMANN DIETZ.

Witnesses:
EDWARD KRESLAUER,
RUDOLPH FRICKE.